United States Patent [19]
Branley

[11] Patent Number: 5,379,723
[45] Date of Patent: Jan. 10, 1995

[54] ANIMAL GROOMING SYSTEM AND METHOD

[76] Inventor: Christine Branley, 97 Derry Rd., Chester, N.H. 03036

[21] Appl. No.: 150,230

[22] Filed: Nov. 10, 1993

[51] Int. Cl.⁶ ............................................. A01K 13/00
[52] U.S. Cl. .......................................... 119/94; 119/83
[58] Field of Search ....................... 119/83, 86, 93, 94; 15/144.4, 176.1

[56] References Cited

U.S. PATENT DOCUMENTS

| | | | |
|---|---|---|---|
| 1,104,531 | 7/1914 | Midgley | 119/93 X |
| 1,278,074 | 9/1918 | Phelps . | |
| 2,690,580 | 10/1954 | Heindorff | 15/172 |
| 2,796,619 | 6/1957 | Hammer | 15/172 |
| 2,799,037 | 7/1957 | Grogan | 15/172 |
| 3,145,691 | 8/1964 | Yates | 119/83 |
| 3,866,257 | 2/1975 | Cansdale, Sr. | 15/144.4 X |
| 4,247,216 | 1/1981 | Pansini | 15/144.4 X |
| 4,793,646 | 12/1988 | Michaud, Jr. | 294/19.1 |
| 4,831,678 | 5/1989 | Dietsche | 15/176.4 |

FOREIGN PATENT DOCUMENTS

| | | | |
|---|---|---|---|
| 482841 | 4/1952 | Canada . | |
| 48313 | 4/1940 | Netherlands . | |
| 272533 | 12/1950 | Switzerland . | |
| 590855 | 7/1947 | United Kingdom | 15/144.4 |

Primary Examiner—Robert P. Swiatek
Attorney, Agent, or Firm—Daniel J. Bourque; Michael J. Bujold; Anthony G. M. Davis

[57] ABSTRACT

A method for utilizing a grooming system including a plurality of user selectable grooming implements which can be releasably and pivotably coupled to a fixed length or extendible grooming implement pole includes selecting a first grooming implement from among a plurality of grooming implements, releasably and pivotably coupling the grooming implement to the grooming implement pole, and grooming the animal such that the grooming implement rotates about the axis of the grooming implement pole. Additional steps may include selecting second and subsequent grooming implements, releasably and pivotably connecting these grooming implements to the pole and grooming the animal with the selected implement.

7 Claims, 4 Drawing Sheets

60

ANIMAL GROOMING SYSTEM AND METHOD

FIELD OF THE INVENTION

This invention relates to animal grooming products and more particularly, to a system and method which utilizes interchangeable animal grooming implements such as coarse and fine brushes, etc., which are removably and pivotably mounted to a pole system, to allow the groomer to easily access and groom all portions of larger animals such as horses.

BACKGROUND OF THE INVENTION

Domesticated large animals such as horses and other large animals kept in zoos or exhibits need constant grooming of their coat in order to maintain a neat appearance, as well as to ensure a good and healthy skin and coat.

Grooming is typically performed by a groomer using a hand brush or other implement such as a curry comb. The groomer must closely approach the animal to be groomed and use his or her own muscle power to clean the animals coat. Often, the animal is quite dirty and dusty which results in the groomer being exposed to a considerable amount of dirt and dust. Additionally, the small hand brushes which are now used take a considerable amount of time to completely groom a large animal like a horse.

Several problems arise with this prior system and method including the inability of a shorter groomer such as a young person, to completely and adequately reach the back of a larger animal such as a horse. A groomer often must resort to using a small step stool or other similar device which forces the groomer to balance precariously around the animal, and increases the likelihood of the groomer falling from the step stool and sustaining an injury. Additionally, young groomers are often afraid to reach the underside or belly of a large animal which is required in order to properly groom the animal. Finally, many groomers do not have the physical strength required to exert enough pressure on the grooming implement to properly clean the animal's coat.

Accordingly, what is needed is a grooming system and method which allows a groomer to remain somewhat removed from the animal to be groomed, while applying enough force on the grooming implement to properly clean the animal's coat. Additionally, such a system and method should allow the groomer to select and interchange a grooming implement from among a number of grooming implements. Finally, such a grooming system should allow the grooming implement to pivot or articulate about a supporting handle, facilitating grooming of both the animal's back, located somewhat higher than the groomer, as well as the animal's underside, located somewhat lower than the groomer.

SUMMARY OF THE INVENTION

This invention features a method for grooming an animal and more particularly, a large animal such as a horse or cow, utilizing a grooming implement pole to which is releasably yet pivotably coupled any one of a number of grooming implements which the user selects.

The method includes selecting one grooming implement from among a number of grooming implements. Each of the grooming implements includes a grooming implement pole coupler, for releasably interconnecting with a grooming implement pole. Additionally, one of either the grooming implement pole coupler or the first end of the grooming implement pole includes a mechanism for allowing the selected grooming implement to be decoupled from the grooming implement pole.

The next step includes coupling the grooming implement pole coupler of the selected grooming implement to the first end of the grooming implement pole. One of either the grooming implement pole coupler or the first end of the grooming implement pole includes a pivoting mechanism which allows the coupled grooming implement to pivot about the grooming implement pole.

Lastly, the method of the present invention includes grooming the animal using the selected grooming instrument which is releasably and pivotably coupled to the grooming implement pole about generally the entire surface of the animal to be groomed such that the grooming implement is allowed to pivot about the grooming implement pole.

In the preferred embodiment of the present invention, additional steps include after grooming the animal with the first selected grooming implement, the steps of selecting a second and subsequent grooming implement, different from the previously used grooming implement; releasably and pivotably coupling the subsequently selected grooming implement to the grooming implement pole; and grooming generally the entire surface of the animal utilizing the subsequently selected grooming implement.

The grooming implement may consist of coarse, medium and fine brushes as well as metal or rubber curry combs, shedding blades, or other similar related implements. The preferred embodiment also includes an extendible grooming implement pole which may be extended or shortened based upon the size or height of the groomer, the size or height of the animal to be groomed and the distance from which the groomer wishes to groom the animal.

DESCRIPTION OF THE DRAWINGS

These, and other features and advantages of the present invention will be better understood by reading the following detailed description, taken together with the drawings wherein.

DETAILED DESCRIPTION OF THE INVENTION

The present invention features a method for utilizing interchangeable animal grooming devices or implements which are removably and pivotably mounted to a pole system, for grooming animals and in particular, larger animals such as horses in the case of domestic animals, or circus and zoo animals such as giraffes, camels, etc.

Figure 1:
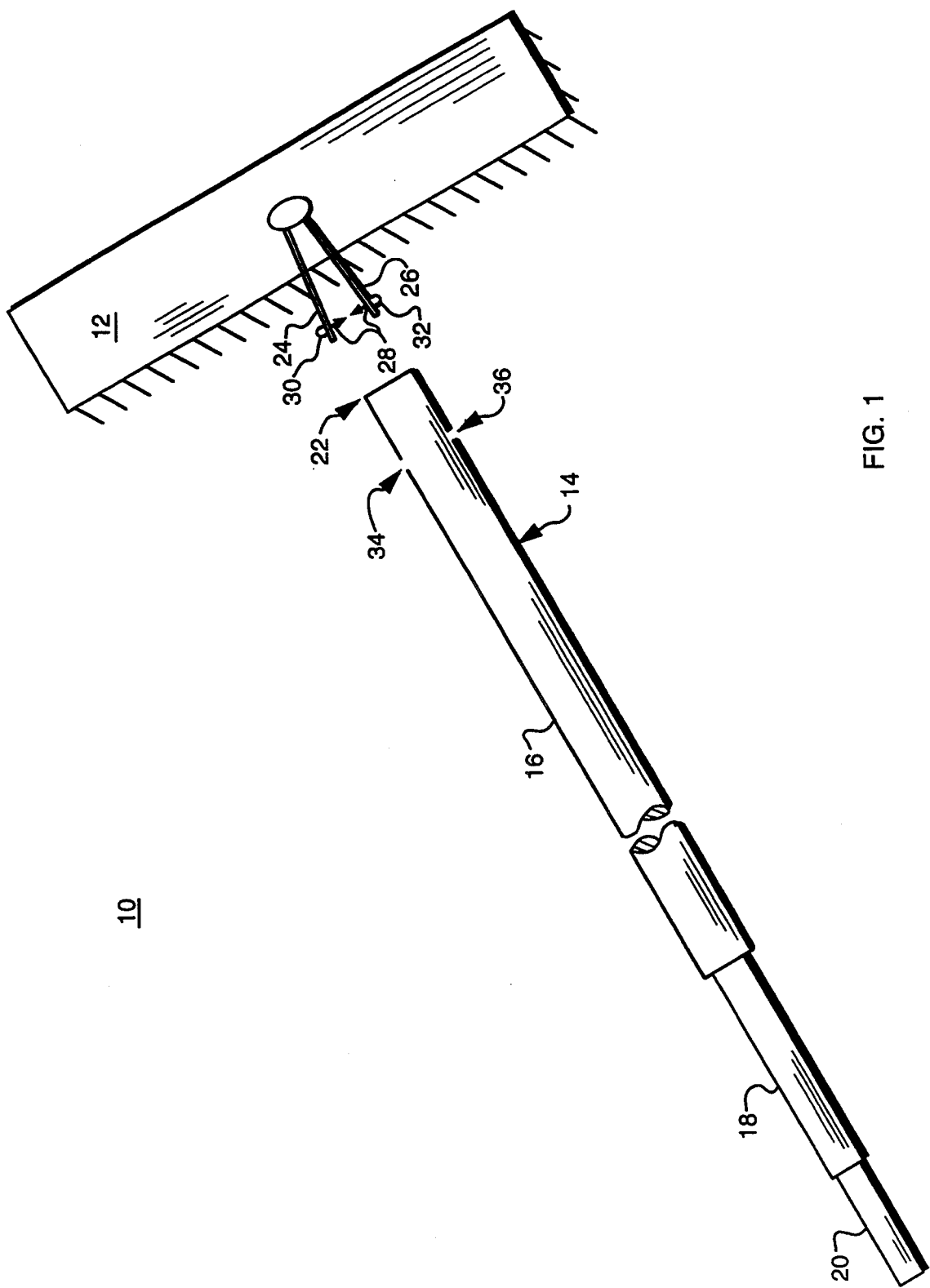
FIG. 1 is a schematic representation of a grooming implement pole and releasably and pivotably coupled grooming implement to be used according to the method of the present invention.

The method of the present invention may be used with an animal grooming system 10, FIG. 1, including an interchangeable animal grooming implement 12 such as a coarse brush, which may be removably yet pivotably coupled to a grooming implement pole 14. In one embodiment, the grooming implement pole may be a fixed length pole made of wood, metal, fiberglass, or other similar material. In the preferred embodiment, the grooming implement pole 14 includes an extendible pole made from a number of sections 16, 18 and 20 as is well known to those skilled in the art.

The user selectable grooming implement 12 is coupled to a first end 22 of the grooming implement pole 14 by means of a releasable mechanism. As shown in the exemplary embodiment, one means of releasably attaching the grooming implement 12 to the grooming implement pole 14 includes first and second attachment elements 24, 26 which are generally flexible and made from a material such as plastic. Depressing the first and second releasable elements 24, 26 in the direction indicated generally by arrows 28 will allow the first and second attachment elements to be inserted into the first end 22 of the grooming implement pole 14.

Each of the first and second attachment elements 24, 26 further includes a mechanism, such as protrusions 30, 32 which, when inserted into the first end 22 of the grooming implement pole 14, engage with first and second holes 34, 36 in the grooming implement pole 14 to secure the grooming implement 12 to the grooming implement pole 14. When the groomer desires to release or change the grooming implement 12, the groomer merely depresses the first and second protrusions 30, 32 located within the first and second holes 34, 36 and removes the grooming implement 12 from the grooming implement pole 14.

Figure 2:
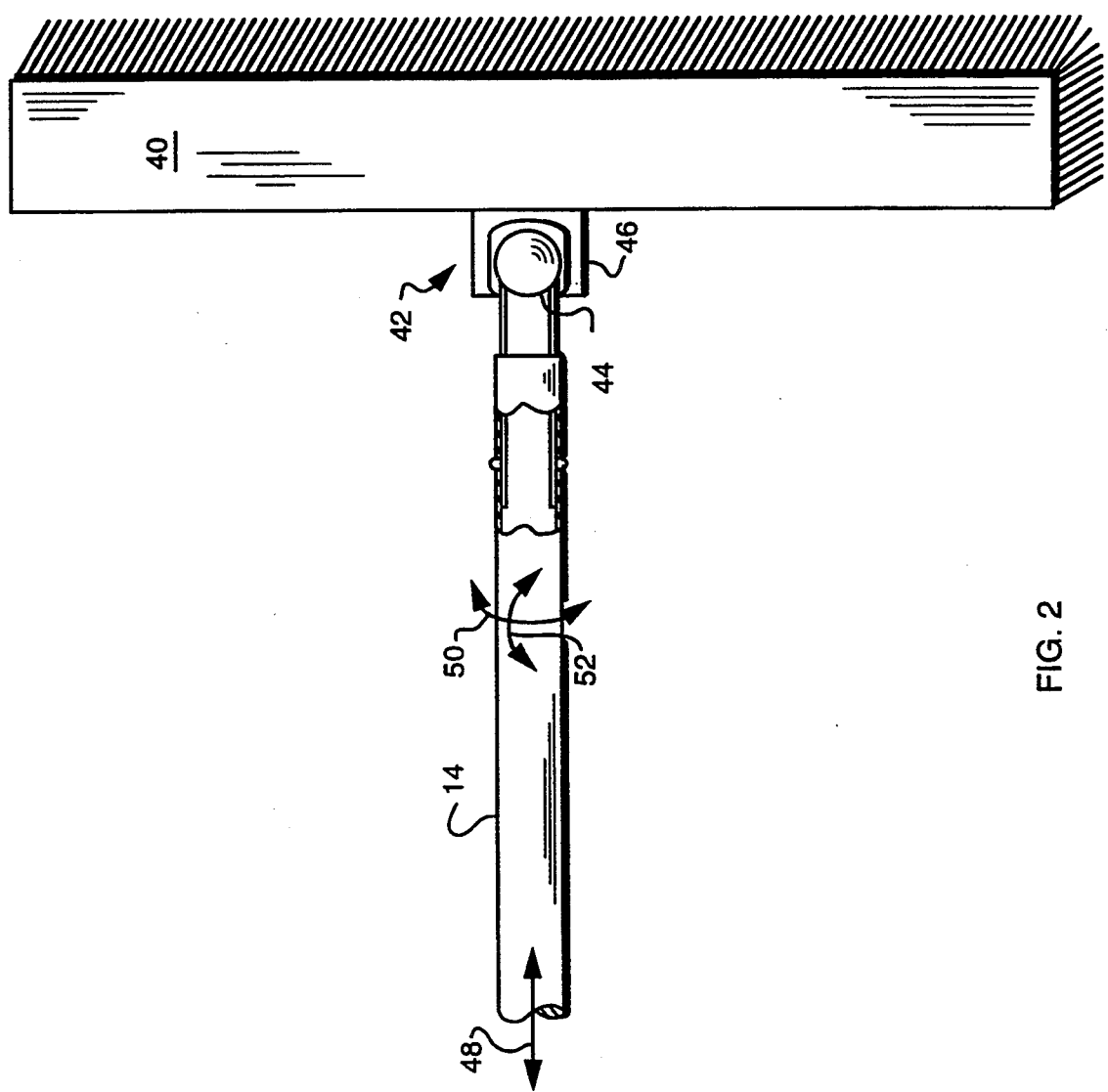
FIG. 2 is a more detailed schematic representation of a grooming implement and a first end of a grooming implement pole illustrating the releasable coupling mechanism and the pivotable mechanism.

As illustrated in FIG. 2, a second, less coarse, grooming implement brush 40 is coupled to the grooming implement pole 14 as previously described in conjunction with FIG. 1. Further illustrated however is a grooming implement pivoter 42 comprising, for exemplary purposes only, a ball 44 and socket 46 which allow the grooming implement 40 to rotate 360 degrees about the longitudinal axis 48 that passes through the grooming implement pole 14 (swiveling movement), and is illustrated generally by arrows 50. Additionally, the grooming implement 40 is also allowed to pivot approximately 360 degrees orthogonal to the grooming implement pole 14 and the axis 48 that passes through the grooming implement pole (forward and backward movement), as shown generally by arrow 52.

Figure 3:
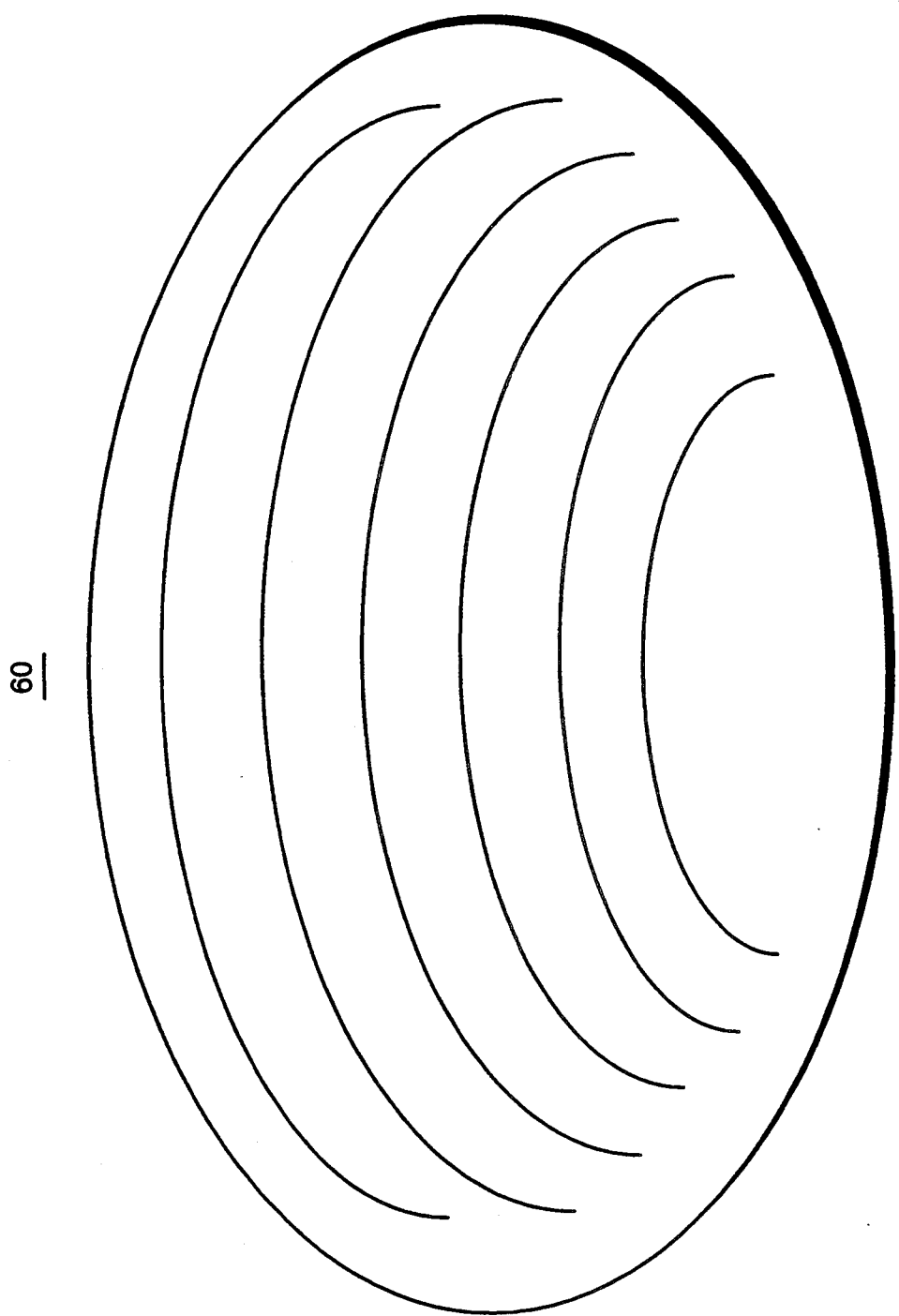
FIG. 3 is an underside view of a curry comb which may serve as one grooming implement for use with the method of the present invention.

A key feature of the method of the present invention is the changing of grooming implements to accommodate the desires of the groomer and the needs of the animal being groomed. For example, a large animal such as a horse may be initially groomed with a grooming implement such as a curry comb 60, FIG. 3, in order to remove hair from the animal's coat. Subsequently, the grooming implement may be changed to a coarse brush, followed by a finer brush, and perhaps ultimately followed by a polishing implement such as a piece of sheepskin, or other similar material. It is recognized that other grooming implements may be utilized, depending upon the animal being groomed, and are considered to be within the scope of the present invention.

Figure 4:
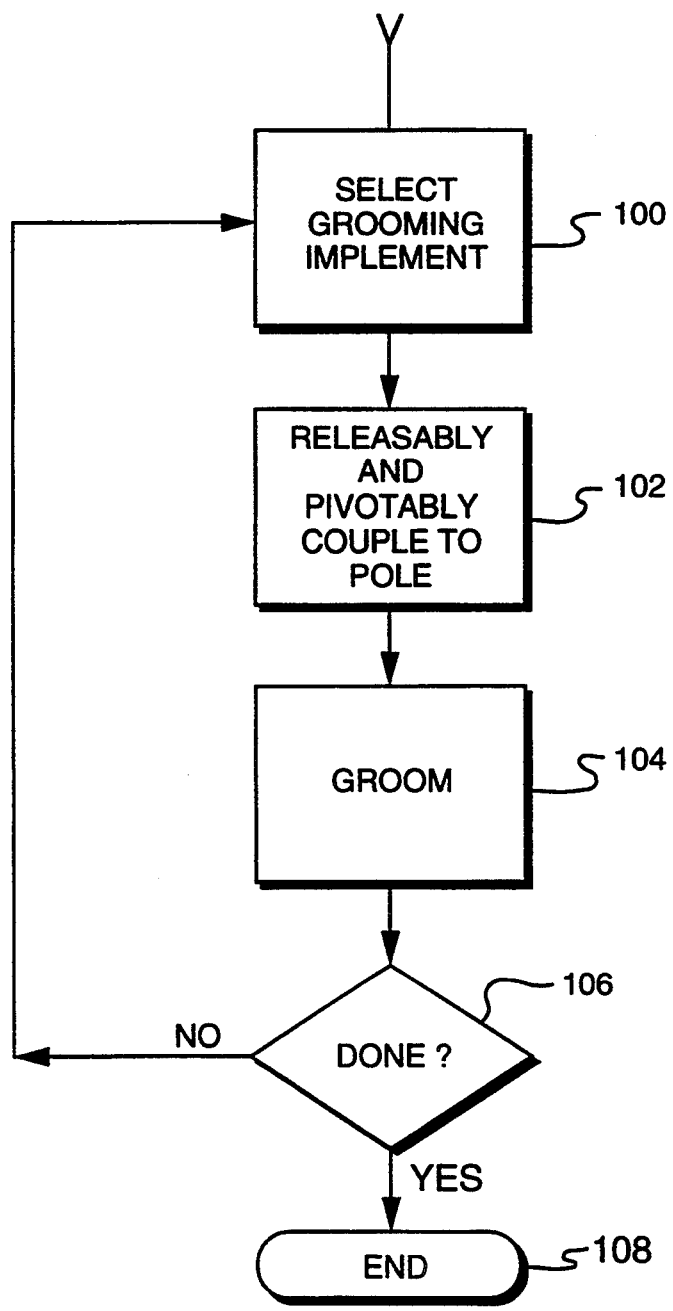
FIG. 4 is a flowchart illustrating the method of the present invention.

The method of the present invention is illustrated in FIG. 4 wherein at step 100, the groomer selects the desired grooming implement, and releasably and pivotably couples the grooming implement to the pole, step 102. At step 104, the animal is groomed followed by a decision at step 106 as to whether or not the grooming is complete. If the grooming is not complete, the method of the present invention involves returning to step 100 to select a second or subsequent grooming implement which is also releasably and pivotably coupled to the grooming implement pole prior to subsequent grooming. Once the groomer decides at step 106 that no further grooming is desired, the method of the present invention ends, step 108.

Modifications and substitutions by one of ordinary skill in the art are considered to be within the scope of the present invention which is not to be limited except by the claims which follow.

I claim:

1. A method for grooming an animal utilizing a grooming implement pole to which may be releasably and pivotably coupled any one grooming implement selected from among a plurality of grooming implements the method comprising the steps of:

selecting one grooming implement from among said plurality of grooming implements each of said grooming implements including a grooming implement pole coupler;

coupling said grooming implement pole coupler of said selected grooming implement to a first end of said grooming implement pole, at least one of said first end of said grooming implement pole and said grooming implement pole coupler of said selected grooming implement including means for releasably decoupling said selected grooming implement from said grooming implement pole, and wherein at least one of said first end of said grooming implement pole and said grooming implement coupler including a grooming implement pivoter, for allowing said grooming implement to at least both rotate about a longitudinal axis that extends parallel to said grooming implement pole, and pivot forward and backwards about an axis orthogonal to said longitudinal axis that extends parallel to aid grooming implement pole; and grooming said animal using at least said selected grooming implement releasably coupled to said grooming implement pole about generally the entire surface area of said animal such that said first selected grooming implement rotates about said longitudinal axis and pivots about an axis orthogonal to said longitudinal axis which extends parallel to said grooming implement pole to which said first grooming implement is releasably coupled.

2. The method of claim 1 wherein said method further includes after the step of grooming said animal, the steps of:

selecting a second grooming implement, different from said first grooming implement;

releasably and pivotably coupling said second selected grooming implement to said grooming implement pole; and grooming generally the entire surface area of said animal utilizing said second selected grooming implement.

3. The method of claim 2 wherein said method further includes the steps of selecting, releasably coupling, and grooming said animal with at least a third grooming implement.

4. The system of claim 1 wherein said plurality of grooming implements are selected from the group consisting of:

a coarse brush, a medium brush, a fine brush and a curry comb.

5. The method of claim 1 wherein said grooming implement pole includes a fixed length pole.

6. The method of claim 1 wherein said grooming implement pole includes an extendible length pole.

7. The system of claim 1 wherein said grooming implement pole coupler of said grooming implement includes said grooming implement pivoter.

* * * * *